United States Patent [19]
Maier et al.

[11] Patent Number: 6,030,174
[45] Date of Patent: Feb. 29, 2000

[54] VARIABLE CHARACTERISTIC DOUBLE-SEALED CONTROL VALVE

[75] Inventors: William C. Maier, Almond, N.Y.; Michael A. Mindock, Easton, Pa.

[73] Assignee: Dresser-Rand Company, Corning, N.Y.

[21] Appl. No.: 08/876,687

[22] Filed: Jun. 17, 1997

Related U.S. Application Data

[63] Continuation of application No. 08/592,005, Jan. 26, 1996, abandoned.

[51] Int. Cl.$^7$ ....................................... F01B 25/02
[52] U.S. Cl. ..................... 415/151; 415/150; 415/209.2
[58] Field of Search ....................... 415/150, 151, 415/157, 200.2; 137/625.37, 625.38; 251/282

[56] References Cited

U.S. PATENT DOCUMENTS

| | | | |
|---|---|---|---|
| 1,122,928 | 12/1914 | Hodges | 251/325 |
| 1,132,203 | 3/1915 | Matthews | 91/24 |
| 1,270,214 | 6/1918 | Ryan . | |
| 1,531,523 | 3/1925 | Stevens | 251/325 |
| 1,807,446 | 5/1931 | Smeby | 137/625.37 |
| 1,855,362 | 4/1932 | Parsons et al. | 415/155 |
| 1,910,698 | 5/1933 | King . | |
| 2,707,480 | 5/1955 | Klosse . | |
| 3,010,695 | 11/1961 | Banks | 251/282 |
| 3,145,927 | 8/1964 | Prouty | 137/625.38 |
| 3,774,638 | 11/1973 | Kriett | 137/625.48 |
| 3,927,690 | 12/1975 | Agren . | |
| 4,154,263 | 5/1979 | Cary | 137/625.38 |
| 4,249,857 | 2/1981 | Berry . | |
| 4,276,906 | 7/1981 | Eguchi | 137/625.38 |
| 4,452,310 | 6/1984 | Pringle et al. . | |
| 4,766,932 | 8/1988 | Heymann et al. | 137/625.3 |
| 5,014,746 | 5/1991 | Heymann | 137/625.38 |
| 5,201,534 | 4/1993 | Miyaoh . | |
| 5,213,133 | 5/1993 | Ellett . | |
| 5,236,014 | 8/1993 | Buls et al. | 137/625.37 |
| 5,259,457 | 11/1993 | Williamson, Jr. . | |
| 5,427,147 | 6/1995 | Henriksson | 137/625.37 |

*Primary Examiner*—Edward K. Look
*Assistant Examiner*—Ninh Nguyen
*Attorney, Agent, or Firm*—Nixon Peabody LLP

[57] ABSTRACT

A method and apparatus for regulating fluid flow through a turbine comprising a valve housing positioned in a fluid flow path, the valve housing having a fluid inlet, a fluid outlet, and chamber connecting the fluid inlet and the fluid outlet; a valve sleeve positioned within the chamber, the sleeve comprising a wall having inner and outer surfaces with a plurality of preferably peripherally spaced ports positioned around the periphery of the sleeve, the ports extending between the inner and outer surfaces; a valve head having first and second ends and at least two seal rings with at least one seal ring proximate the first and second ends respectively, the head dimensioned to fit tightly and move reciprocatively within the sleeve; a valve stem having a first and second end, wherein the first end is attached to the valve head, the stem extending away from the valve head; and an actuator attached to the second end of the valve stem.

35 Claims, 5 Drawing Sheets

VARIABLE CHARACTERISTIC DOUBLE-SEALED CONTROL VALVE

This application is a continuation of application Ser. No. 08/592,005, filed Jan. 26, 1996.

FIELD OF THE INVENTION

The present invention relates to the field of turbomachinery, especially to valves used to control fluid and steam flow through turbines.

BACKGROUND OF THE INVENTION

Turbines are often provided with valves which control the flow of fluids such as gases or liquids (particularly steam) in various directions. The fluids are directed to turbine blades of the turbine to impart a rotational force or torque which is translated to a shaft. During turbine operation, it is necessary to vary the flow rate or pressure of entering fluid using control valves. For example, during start-up, the flow rate of fluid may be low so that turbine components can come to thermal equilibrium without incurring undo stresses. The flow rate is then increased to raise the turbine's rotational velocity. When such velocity or power output must be reduced, the flow rate of the motive fluid must be decreased. In certain turbine applications, changes in the rotational velocity require relatively small and precise adjustments. Further, fluid flow rate control valves should provide a tight seal to permit fluid flow to be shut off without leakage when the turbine is to be stopped.

Some presently available steam governor valves require applying an excessive amount of physical force to overcome the force of the steam pressure, and move the valve from a closed position to an open position. Other steam governor valves which have some means of balancing this large pressure force have excessive closed valve leakage, or poor low flow control. Presently used turbine governor valves are sized for small pressure losses at full load conditions and do not allow for small deviations in low fluid flow rates. It is therefore difficult to regulate fluid flow with precision at low or no-load operating conditions. It is especially difficult to regulate and maintain a low fluid flow rate when the inlet fluid is at a high pressure. Known steam turbine valves have generally poor control characteristics where, even at very small valve opening positions, the flow capacity increases much too quickly. Such valves deliver a relatively high fluid flow rate when even partially open. This makes precise turbine flow control especially low flow control difficult or impossible to achieve.

Many recognized valve designs have been tried in existing valve applications. Known "lantern-type" valves have double seats to allow pressure balancing. However, these valves require two typically beveled valve seats to both seal at the same time. Continued force fitting of the valve head into the seats leads to fatigue, and metal to metal wear of the valve seat, of control handles, and the threading mechanically linked to the valves. Where tight shut off during repeated cycles of valve openings and closings is required, valves with multiple ring seals have been used. U.S. Pat. Nos. 1,122,928 and 1,531,523 disclose piston type valves with multiple ring seals to seal off steam flow. The primary objective of these valves was a tight seal when steam flow was to be shut-off, and a large, fully opened flow capacity. Unfortunately, the valves are configured to allow only on/off operation, and as such are not applicable to precise flow metering required of turbine control valves.

A turbine governor valve which could 1) permit a range of predetermined fluid flow rates, including very small fluid flow rates, 2) provide complete shutoff, and 3) have low actuator force requirements would be highly advantageous.

SUMMARY OF THE INVENTION

The present invention relates to a fluid flow regulator comprising a valve housing positioned in a fluid flow path. The valve housing has a fluid inlet, a fluid outlet, and a chamber connecting the fluid inlet and the fluid outlet. A valve sleeve is positioned within the chamber. The valve sleeve has a periphery and a wall having inner and outer surfaces with a plurality of spaced ports positioned around the periphery of said sleeve, with the ports extending between the inner and outer surfaces. A valve head is dimensioned to fit tightly, and move reciprocatively within the sleeve. The valve head has a first and second end and at least two seal rings with at least one seal ring proximate the first and second ends respectively. The valve head has a valve stem attached thereto, the stem having a first and second end, wherein the first end is attached to said valve head, and the second end extends away from the valve head. An actuator capable of moving the valve stem and valve head along its central axis is attached to the valve stem.

Another embodiment of the present invention relates to a turbine comprising a turbine housing, at least one turbine blade wheel connected to a turbine shaft, at least one diaphragm, and a fluid flow regulator assembly. The assembly has a valve housing positioned in a fluid flow path. The valve housing has a fluid inlet, a fluid outlet, and a chamber connecting the fluid inlet and the fluid outlet. A valve sleeve is positioned within the chamber. The valve sleeve has a periphery and a wall having inner and outer surfaces with a plurality of spaced ports positioned around the periphery of said sleeve, with the ports extending between the inner and outer surfaces. A valve head is dimensioned to fit tightly, and move reciprocatively within the sleeve. The valve head has a first and second end and at least two seal rings with at least one seal ring proximate the first and second ends respectively. The valve head has a valve stem attached thereto, the stem having a first and second end, wherein the first end is attached to said valve head, and the second end extends away from the valve head. An actuator capable of moving the valve stem and valve head along its central axis is attached to the valve stem.

A further embodiment of the present invention relates to a valve assembly comprising a periphery and a wall having inner and outer surfaces with a plurality of spaced ports positioned around the periphery of said sleeve, with the ports extending between the inner and outer surfaces. A valve head is dimensioned to fit tightly, and move reciprocatively within the sleeve. The valve head has a first and second end and at least two seal rings with at least one seal ring proximate the first and second ends respectively. The valve head has a valve stem attached thereto, the stem having a first and second end, wherein the first end is attached to said valve head, and the second end extends away from the valve head.

A still further embodiment of the present invention relates to a method for regulating fluid flow in a turbomachine comprising a turbine housing, a fluid flow intake, a fluid flow exhaust, at least one turbine blade wheel attached to a turbine shaft, and at least one diaphragm. Fluid flow is directed through the fluid flow intake. A valve housing of a governor valve assembly having a fluid inlet, a fluid outlet, a chamber connecting the fluid inlet and the fluid outlet is provided to the path of a fluid flow. A valve sleeve is positioned within said chamber. The valve sleeve has a periphery and a wall having inner and outer surfaces with a plurality of spaced ports positioned around the periphery of said sleeve, with the ports extending between the inner and outer surfaces. A valve head is dimensioned to fit tightly, and move reciprocatively within the sleeve. The valve head has a first and second end and at least two seal rings with at least one seal ring proximate the first and second ends respectively. The valve head has a valve stem attached thereto, the stem having a first and second end, wherein the first end is attached to said valve head, and the second end extends away from the valve head. An actuator capable of moving the valve stem is attached to the valve stem. The governor valve assembly is actuated via the actuator such that the valve head is moved to a preselected position within the valve sleeve to regulate the fluid flow rate through the valve assembly.

The fluid flow regulator of the present invention provides greater control of fluid flow regulation through a turbomachine as a result of the port configuration on the valve sleeve. The valve assembly also provides for a complete shut-off in the closed position due to the configuration of the ring seals on the sleeve. The complete shut-off stops fluid leakage in the closed position.

DETAILED DESCRIPTION OF THE INVENTION

Figure 1:
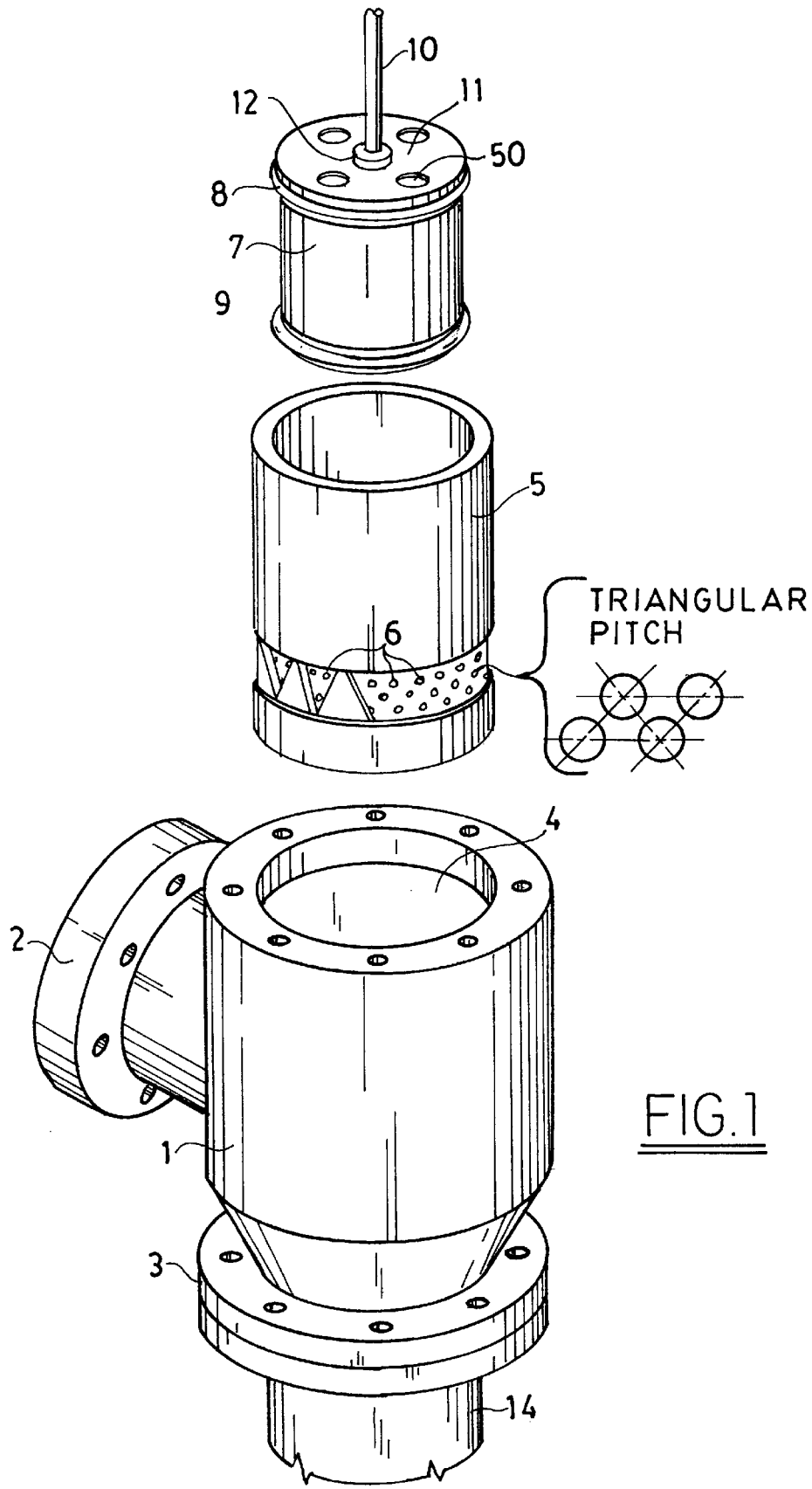
FIG. 1 is an exploded, partially broken away perspective view of the governor valve assembly of the present invention.

FIG. 1 shows valve housing 1 having inlet flange 2, exhaust flange 3, and access opening 4. Cylindrical valve sleeve 5 with an outer diameter smaller than the inner diameter of access opening 4 in housing 1 is placed into housing 1. Sleeve 5 has a series of circumferential ports 6 which radially extend through the wall of sleeve 5. A cylindrical valve head 7 having seal rings 8, 9 fitted securely about its circumference is positioned within valve sleeve 5. Valve stem 10 is securely attached to the top 11 of valve head 7 at position 12, and extends vertically. Exhaust flange 2 is shown attached to turbine body flange 14. Balancing holes 50 extend through top 11.

Figure 2:
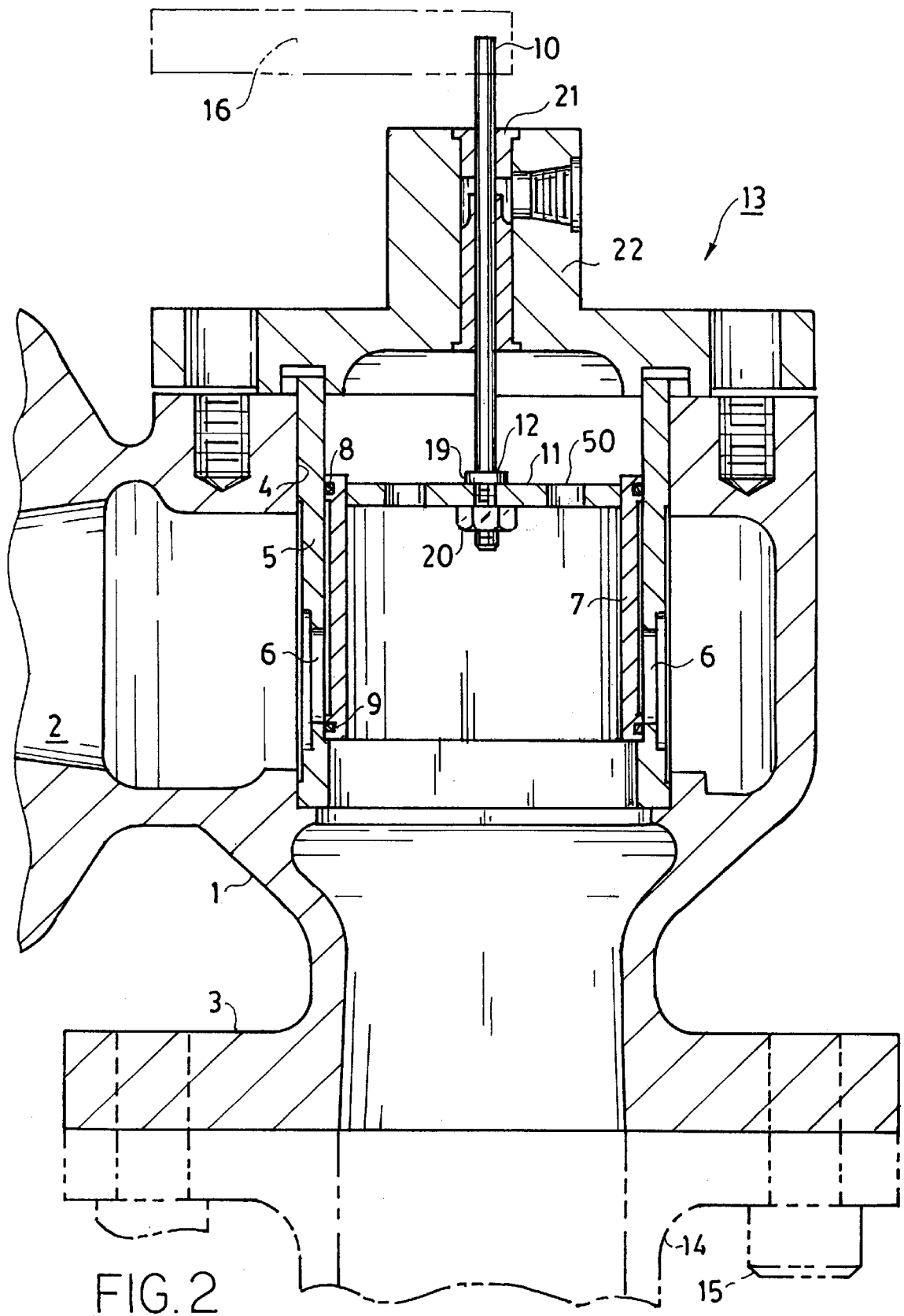
FIG. 2 is a cross-sectional view of the governor valve assembly of the present invention in the closed position.

FIG. 2 is a cross-sectional view of valve assembly 13 showing the components of FIG. 1 in their assembled state. Exhaust flange 3 of valve housing 1 is fitted securely to turbine body flange 14 with bolts 15. The valve sleeve 5 is fitted into the housing 1 in the inlet/exhaust flow path. Valve head 7 is shown fitted into sleeve 5 with seal rings 8, 9 engaging the inner wall of sleeve 5. Valve head 7 has multiple pressure balancing holes 50 in its top portion 11. A valve stem 10 is secured to the valve head 7 by attaching nut 20 on a threaded end of valve stem 10 which extends through an opening 19 in top portion 11. Valve stem 10 extends vertically upward through seal 21 in valve housing cover 22 and is attached to the selected actuator mechanism represented by box 16. The selected actuator mechanism 16 may be any actuator including piston-type assemblies, for example a pneumatic or hydraulic piston assembly, and is capable of applying the necessary force to raise and lower the valve head within the valve sleeve. As shown in FIG. 2, valve head 7 is in a fully closed position, with valve head 7 fully covering valve sleeve ports 6. Seal ring 9 engages the inner wall of sleeve 5 at a point below ports 6. In this position fluid flow from the inlet flange 2 is blocked from proceeding through ports 6 of the governor valve assembly.

Figure 3:
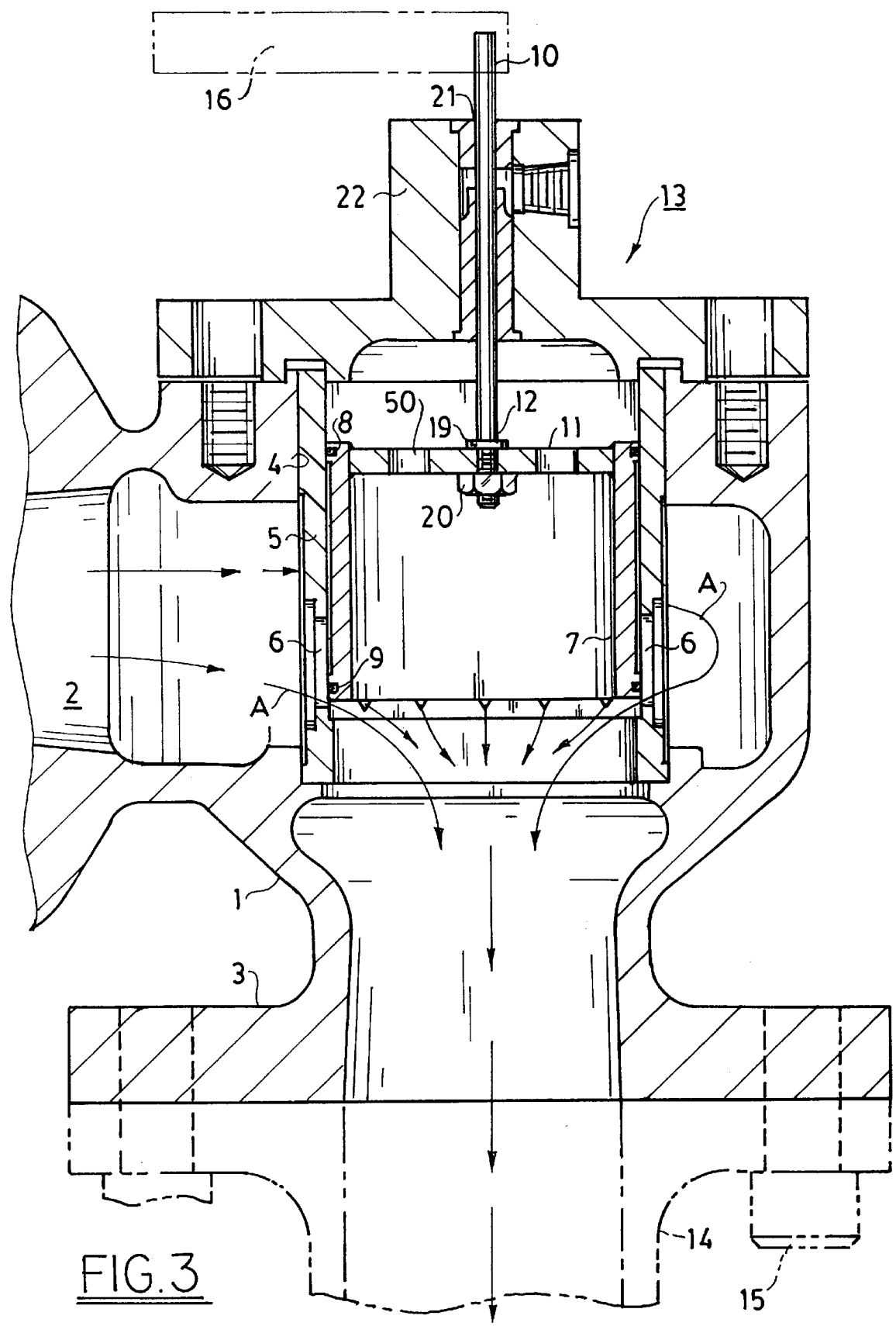
FIG. 3 is a cross-sectional view of the governor valve assembly of the present invention in a partially open position, allowing minimal flow.

FIG. 3 is a cross-sectional view of the valve assembly 13 of the present invention in a partially closed position. Here, valve head 7 is raised to a position such that it covers only a portion of ports 6 in valve sleeve 5. In this position, a low and predetermined fluid flow rate is permitted through the valve assembly. Such flow proceeds along the path defined by arrows A; from flange 2 through valve sleeve ports 6, and out through valve exhaust housing 3.

Figure 4:
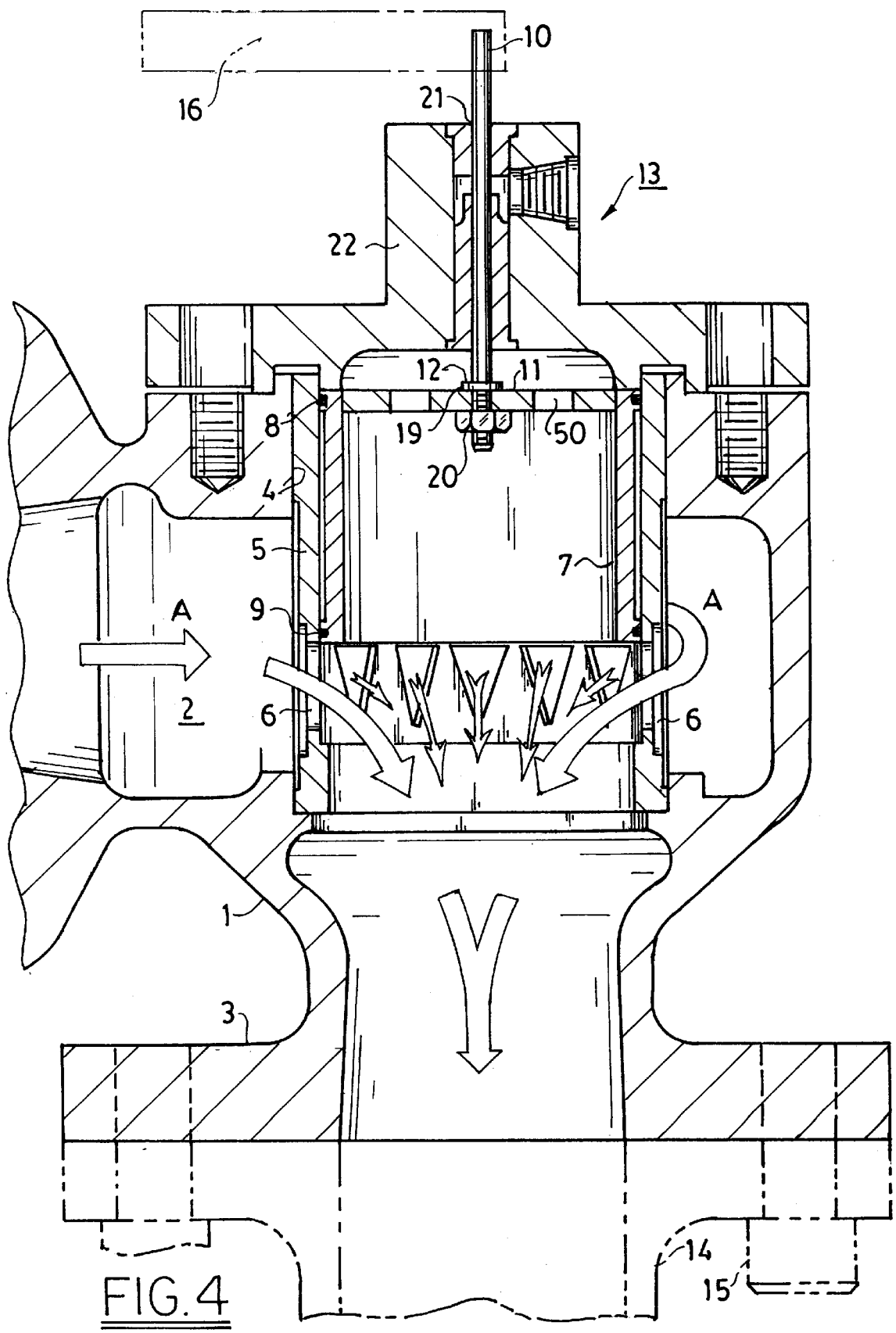
FIG. 4 is a cross-sectional view of the governor valve assembly of the present invention in a fully open position allowing maximum flow.

FIG. 4 is a cross-sectional view of the valve assembly of the present invention in a fully open position. Here, valve head 7 has been raised within valve sleeve 5 to a position such that the lower end of valve head 7 is above fully opened ports 6. In this position, the fluid flow rate is at a maximum and follows the path defined by arrow A from flange 2 through ports 6 to valve exhaust 3 and into the turbine body through flange 14.

Figure 5:
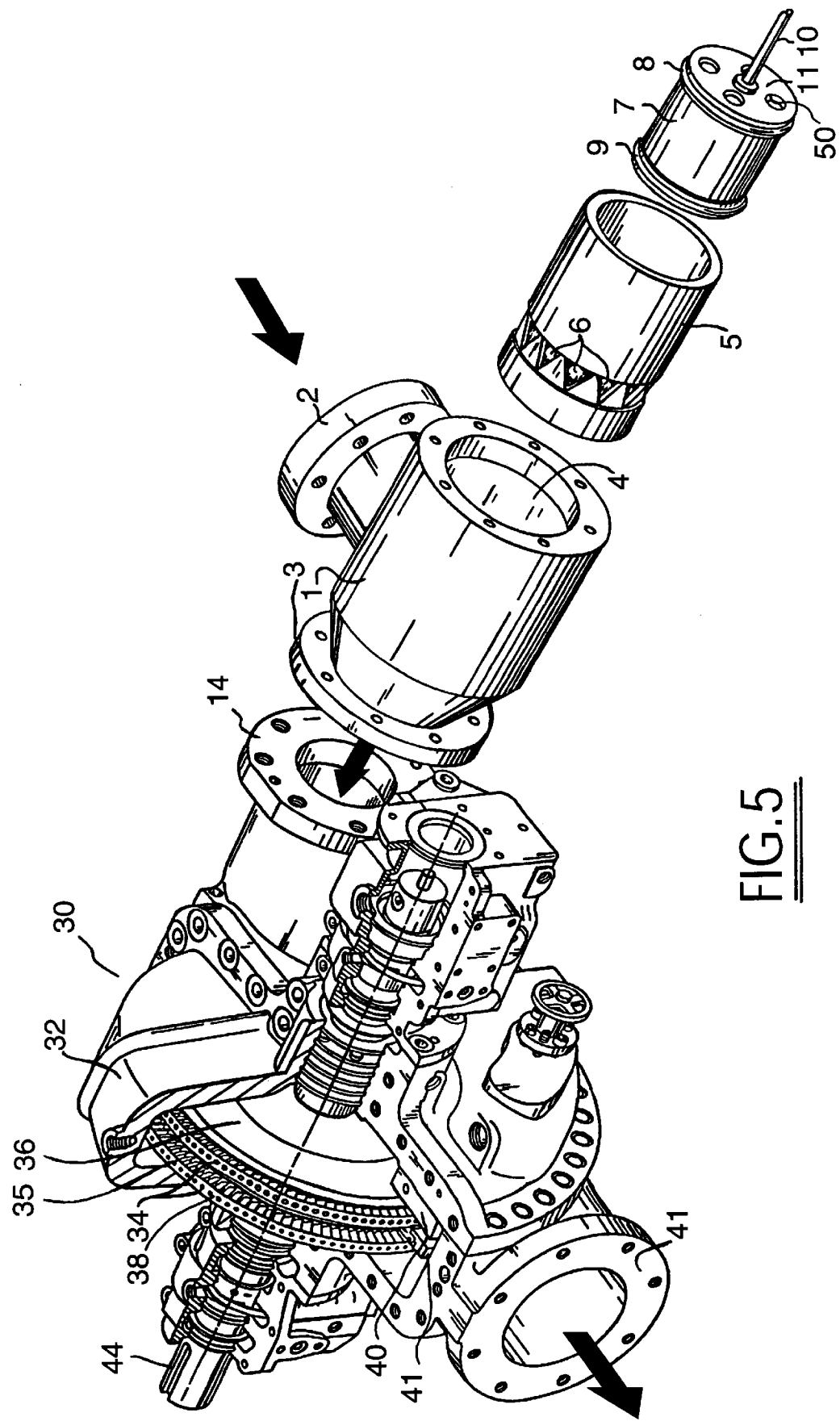
FIG. 5 is a perspective view of the governor valve assembly in relation to a turbine to which the assembly is fitted.

FIG. 5 is a perspective view of the governor valve assembly, according to one configuration, attached to turbine body flange 14 of a two row velocity compounded single stage turbine 30. Steam travels from a source (not shown) to intake flange 2 of the valve housing 1, through ports 6 of the sleeve, and through outlet flange 3 which is sealably attached to turbine body flange 14. The steam travels through turbine 30 into turbine housing 32, and is directed by the stationary blades in diaphragm 40 to turbine blades 34 located circumferentially along the periphery of turbine wheels 36, 38, and stationary blades (not visible) on the periphery of reversing ring 41, and out through turbine exhaust flange 42. Angular momentum of the motive fluid is imparted to turbine wheels 36, 38 causing rotation of attached turbine shaft 44.

In operation, to initiate transfer of the rotational force or torque, to a turbine, a minimal amount of start-up fluid flow is desired. Initially, the valve head is fully depressed, in the closed position in the valve sleeve with seal rings 8, 9 isolating flow control ports 6 from the outlet of the valve body. (FIG. 2). Fluid at inlet conditions has free access through the valve housing inlet through the inlet flange to the valve housing and the upstream side of control ports 6 in valve sleeve 5. To deliver flow to the turbine, an actuator mechanism is engaged, for example a piston-type mechanism driven pneumatically, hydraulically, etc. as would be readily understood by one skilled in the field of mechanical valve design, to apply lifting force to the valve stem of the valve head. To initiate turbine rotation, the valve head is raised within the valve sleeve allowing fluid flow to proceed through the valve sleeve ports 6, by the lower seal ring 9, out the valve exhaust, and through the stationary blades to the rotor blades, thus moving the turbine wheel. (FIG. 3). To increase the rotational velocity, or the output power of the turbine, the fluid flow rate is increased as desired, by raising the valve head up to a maximum flow position where the entire area of the ports 6 are open to the valve outlet. (FIG. 4). The lifting force of the actuator can raise the valve head to a predetermined position within the valve sleeve such that a portion of, or the full area of each port in the sleeve is left uncovered by the valve head seal rings and is exposed to the valve outlet.

To decrease rotational velocity of the turbine, the actuating mechanism depresses the valve head within the sleeve, restricting flow through the sleeve ports, until the desired, decreased rotational velocity or reduction in power level is achieved. To shut off the turbine, the valve head is fully depressed within the sleeve, such that no flow leaks through the ports. This is both the final and starting position, as shown in FIG. 2. In this "closed" position of the turbine valve assembly, an actuator will be applying a minimal force sufficient to keep the valve head fully depressed to a closed position in the valve sleeve. The only fluid leakage path in this closed position is around the seal rings, and by the end gap of the rings. This leakage path is negligible compared to that of other pressure balanced valves.

The ports are fashioned in the sleeve to assist in matching the actuator travel to the turbine flow requirements, and delivering a predictable and controllable fluid flow rate to the turbine. The ports allow great freedom in being able to match the valve lift with respect to flow capacity. The ports may be of any shape, but are preferably shaped and oriented such that a minimal flow initially may be established as the ports are exposed to fluid flow. In this way the smallest possible volume of fluid flow will pass through the governor valve as the valve head begins to expose the ports. For example, in one particularly preferred embodiment, the ports may be shaped as triangles positioned such that the apex of the triangles point "downward", (toward the end of the sleeve opposite that into which the valve head is inserted), relative to the top of the valve assembly. In this way, as the valve head is raised within the sleeve, the fluid flow will proceed only through the "point" of the triangular ports, as only the "points" of the ports are then exposed to the fluid flow. Orienting the triangle in this way insures that the smallest possible fluid flow can be achieved when the ports are initially opened to permit precise control of fluid flow. In addition, the large base ends of the triangles allow high fluid flow rates at maximum flow conditions.

While the preferred ports are shown as an array of triangular openings located about the circumference of a cylindrical valve sleeve, it is understood that ports of varying shape may be positioned around a sleeve of any shape to permit the valve to effect desired flow regulation characteristics. The ports may also be comprised of many small openings of any shape such as rectangular, and preferably circular, to form a port area. These small openings may then be, for example, arranged circumferentially around the circumference of the valve sleeve into any configuration desired, including triangular or square pitch patterns, but may be arranged into any configuration resulting in enhanced fluid flow rate control and regulation as may be desired.

When used to regulate steam flow to a turbine, the parts of the valve assembly can be made from any material able to withstand the operating conditions of extreme heating and cooling cycles between temperatures ranging from about −40° C. to about 550° C. Metals and alloys, such as CA6NM or 316 stainless steel are particularly preferred, with a Ni-resist preferably used as the seal ring material.

The presence of seal rings 8 and 9 achieve a relatively tight fit when valve head 7 is in the closed position. This prevents fluid leakage out of the valve assembly and through the exhaust housing. As a result, complete shut-off is achieved and the safety and utility of the valve assembly, and the turbine control system is enhanced.

The use of two seal rings 8, 9 in conjunction with pressure balancing holes 50 in valve head 7 minimizes the force the actuator exerts on the valve stem during raising and lowering the valve head within the sleeve by creating balancing pressure forces. Since less actuating force is required, using the seal rings to create these balancing forces also assists in regulating fluid flow. It is to be understood that in further preferred embodiments, the seal rings may be incorporated into the sleeve rather than the valve head. Likewise, the pressure balancing holes can be internal in the valve head or could be piped externally.

The valve stem can be attached to the top of the valve head in a variety of ways, including the use of welds, bolts, screws, etc. The stem and valve head top may also be machined as a one piece unit.

Many other modifications and variations of the present invention are possible to the skilled practitioner in the field in light of the teachings herein. It is therefore understood that, within the scope of the claims, the present invention can be practiced other than as herein specifically described.

What is claimed:

1. A fluid flow regulator comprising:

a valve housing positioned in a fluid flow path, said valve housing having a fluid inlet, a fluid outlet, and chamber connecting the fluid inlet and the fluid outlet;

a valve sleeve having a periphery positioned within said chamber and comprising a wall having inner and outer surfaces with a plurality of spaced port areas positioned around the periphery of said sleeve, said port areas permitting a fluid flow between the inner and outer surfaces, wherein each of said port areas has a shape geometrically configured such that the portion of the shape having the smallest volume is the portion first exposed to the fluid flow and the volume of the shape expands from this portion;

a valve head having first and second ends and at least two seal rings with at least one seal ring proximate the first and second ends respectively, said head dimensioned to fit tightly and move reciprocatively within said sleeve;

a valve stem having a first and second end, wherein the first end is attached to said valve head, said stem extending away from the valve head; and an actuator attached to the second end of the valve stem.

2. The regulator of claim 1, wherein the port areas are configured to allow an increasing amount of fluid flow to pass through said port areas as the actuator moves the valve head from a fully closed to a fully open position.

3. The regulator of claim 1, wherein the shape of each said port areas is triangular.

4. The regulator of claim 1, wherein each said port areas define a recessed region in the sleeve wall with a plurality of openings that extend through the sleeve wall in the recessed area.

5. The regulator of claim 4, wherein said openings are circular.

6. The regulator of claim 5, wherein said circular openings are arranged in triangular configurations.

7. The regulator of claim 1, wherein the seal rings are positioned on the valve head to achieve balanced pressure forces.

8. The regulator of claim 1, wherein the valve sleeve is cylindrical.

9. The regulator of claim 1, wherein the valve head comprises balancing holes through one end of the valve head.

10. A turbine comprising:

a turbine housing;

at least one turbine blade wheel connected to a turbine shaft;

at least one diaphragm; and a fluid flow regulator assembly comprising a valve housing positioned in a fluid flow path, said salve housing having a fluid inlet, a fluid outlet, and a chamber connecting the fluid inlet and the fluid outlet;

a valve sleeve having a periphery positioned within said chamber and comprising a wall having inner and outer surfaces with a plurality of spaced port areas positioned around the periphery of said sleeve, said port areas permitting a fluid flow between the inner and outer surfaces, wherein each of said port areas has a shape geometrically configured such that the portion of the shape having the smallest volume is the portion first exposed to the fluid flow and the volume of the shape expands form this portion;

a valve head having first and second ends and at least two seal rings with at least one seal ring proximate the first and second ends respectively, said head dimensioned to fit tightly and move reciporactively within said sleeve;

a valve stem having a first and second end, wherein the first end is attached to said valve head, said stem extending away form the valve head; and an actuator attached to the second end of the valve stem.

11. The turbine of claim 10, wherein the ports are configured to allow an increasing amount of fluid flow to pass through said ports as the actuator moves a valve assembly from a fully closed to a fully open position.

12. The turbine of claim 10, wherein the shape of each said port areas is triangular.

13. The turbine of claim 10, wherein each said port areas define a recessed region in the sleeve wall with a plurality of openings that extend through the sleeve wall in the recessed area.

14. The turbine of claim 13, wherein said openings are circular.

15. The turbine of claim 14, wherein said circular openings are arranged in triangular configurations.

16. The turbine of claim 10, wherein the seal rings are positioned on the valve head to achieve balanced pressure forces.

17. The turbine of claim 10, wherein the valve sleeve is cylindrical.

18. The turbine of claim 10, wherein the valve head further comprises balancing holes through one end of the valve head.

19. A valve assembly comprising:

a valve sleeve comprising a periphery and a wall having inner and outer surfaces with a plurality of spaced port areas positioned around the periphery of said sleeve, said port areas permitting a fluid flow between the inner and outer surfaces, wherein each of said ports has a shape geometrically configured such that the portion of the shape having the smallest volume is the portion first exposed to the fluid flow and the volume of the shape expands from this portion;

a valve head having first and second ends and at least two seal rings with at least one seal ring proximate the first and second ends respectively, said head dimensioned to fit tightly and move reciporactively within said sleeve; and a valve stem having a first and second end, wherein the first end is attached to said valve head, said stem extending away form the valve head.

20. The valve assembly of claim 19, wherein the shape of each said port areas is triangular.

21. The valve assembly of claim 19, wherein each said port areas define a recessed region in the sleeve wall with a plurality of openings that extend through the sleeve wall in the recessed area.

22. The valve assembly of claim 21, wherein said openings are circular.

23. The valve assembly of claim 22, wherein said circular openings are arranged in triangular configurations.

24. The valve assembly of claim 19, wherein the seal rings are positioned on the valve head to achieve balanced pressure forces.

25. The valve assembly of claim 19, wherein the valve sleeve is cylindrical.

26. The valve assembly of claim 19, wherein the valve head further comprises balancing holes through one end of the valve head.

27. A method for regulating fluid flow in a turbomachine comprising:

providing a turbine comprising a turbine housing, a fluid flow intake, a fluid flow exhaust, at least one turbine blade wheel attached to a turbine shaft, and at least one diaphragm;

directing a fluid flow through the fluid flow intake;

providing to the turbine a valve housing in the path of a fluid flow, said valve housing having a fluid inlet, a fluid outlet, a chamber connecting the fluid inlet and the fluid outlet, a valve sleeve having a periphery positioned within said chamber and comprising a wall having inner and outer surfaces with a plurality of spaced port areas positioned around the periphery of said sleeve, said port areas permitting a fluid flow between the inner and outer surfaces, wherein each of said port areas has a shape geometrically configured such that the portion of the shape having the smallest volume is the portion first exposed to a fluid flow and the volume of the shape expands from this portion, a valve head having first and second ends and at least two seal rings with at least one seal ring proximate the first and second ends respectively, said head dimensioned to fit tightly and move reciprocatively within said sleeve, a valve stem having a first and second end, wherein the first end is attached to said valve head, said stem extending away from the valve head, and an actuator attached to the second end of the valve stem; and actuating the actuator to create a force sufficient to move the valve stem and valve head to a preselected position thereby regulating flow.

28. The method of claim 27, wherein the ports are configured to allow an increasing amount of fluid flow to pass through said ports as the actuator moves a valve assembly from a fully closed to a fully open position.

29. The method of claim 27, wherein the shape of each said port areas is triangular.

30. The method of claim 27, wherein each said port areas define a recessed region in the sleeve wall with a plurality of openings that extend through the sleeve wall in the recessed area.

31. The method of claim 30, wherein said openings are circular.

32. The method of claim 31, wherein said circular openings are arranged in triangular configurations.

33. The method of claim 27, wherein the seal rings are positioned on the valve head to achieve balanced pressure forces.

34. The method of claim 27, wherein the valve sleeve is cylindrical.

35. The method of claim 27, wherein the valve head further comprises balance holes through the end of the valve head.

* * * * *